US011535133B2

(12) United States Patent
Hallock et al.

(10) Patent No.: US 11,535,133 B2
(45) Date of Patent: Dec. 27, 2022

(54) CONNECTION ARRANGEMENT FOR TUBULAR MEMBERS

(71) Applicant: LEAR CORPORATION, Southfield, MI (US)

(72) Inventors: Joshua Hallock, Warren, MI (US); David Abdella, Royal Oak, MI (US); Sam Blair, Troy, MI (US)

(73) Assignee: LEAR CORPORATION, Southfield, MI (US)

( * ) Notice: Subject to any disclaimer, the term of this patent is extended or adjusted under 35 U.S.C. 154(b) by 175 days.

(21) Appl. No.: 17/202,813

(22) Filed: Mar. 16, 2021

(65) Prior Publication Data

US 2022/0297581 A1 Sep. 22, 2022

(51) Int. Cl.
*B60N 2/68* (2006.01)
*F16B 7/04* (2006.01)
*F16B 1/00* (2006.01)
*H01R 13/627* (2006.01)
*H01R 13/26* (2006.01)

(52) U.S. Cl.
CPC ............... *B60N 2/682* (2013.01); *F16B 1/00* (2013.01); *F16B 7/042* (2013.01); *H01R 13/6275* (2013.01); *F16B 2001/0064* (2013.01); *H01R 13/26* (2013.01); *H01R 2201/26* (2013.01)

(58) Field of Classification Search
CPC . B60N 2/682; F16B 1/00; F16B 7/042; F16B 7/00; F16B 7/04; F16B 7/0406; F16B 7/0413; F16B 2001/0064; H01R 13/6275; H01R 13/26; H01R 2201/26

USPC ...................................................... 297/463.1
See application file for complete search history.

(56) References Cited

U.S. PATENT DOCUMENTS

| 6,095,572 | A | 8/2000 | Ford et al. | |
| 6,106,026 | A * | 8/2000 | Smith, III | F16L 37/35 285/85 |
| 9,291,294 | B2 * | 3/2016 | Lehmann | F16L 37/113 |
| 2006/0290180 | A1 | 12/2006 | Belair et al. | |

FOREIGN PATENT DOCUMENTS

JP 2008-013150 * 1/2008

OTHER PUBLICATIONS

DZUS D4 Product Literature—Standard Line Quarter-Turn Fasteners.

* cited by examiner

*Primary Examiner* — Mark R Wendell
(74) *Attorney, Agent, or Firm* — Brooks Kushman P.C.

(57) ABSTRACT

A connection arrangement for tubular members may include a latch arrangement having a latch hook attached to a first tubular member and a striker arrangement attached to a second tubular member. The striker arrangement may include a transverse member extending transverse to the length of the second tubular member. The transverse member may be positioned proximate to the latch hook when an end of the first tubular member is positioned adjacent to an end of the second tubular member such that rotation of the latch hook engages the transverse member and effects a clamping force between the first tubular member and the second tubular member in a direction transverse to the rotational axis of the latch hook.

20 Claims, 4 Drawing Sheets

CONNECTION ARRANGEMENT FOR TUBULAR MEMBERS

TECHNICAL FIELD

The present disclosure relates to a connection arrangement for tubular members.

BACKGROUND

Because of their strength, resistance to bending, and relatively light weight when compared to solid members, tubular members are used in many structural applications. An automotive vehicle, for example, may employ various kinds structural members in the vehicle body or to support the seating systems. When structural members are made from stamped metal, it is often relatively easy to connect them to each other or to other metal structures, for example, by tack welding. When tubular members are used, however, connecting them to each other can be time consuming and difficult because they often require long beads of weld to be formed at connection interfaces. Therefore, a need exists for a connection arrangement for tubular members that overcomes problems associated with current connection options.

SUMMARY

At least some embodiments described herein may include a connection arrangement for tubular members that includes a first tubular member having two ends and defining a first longitudinal axis, and a second tubular member having two ends and defining a second longitudinal axis. The first tubular member and the second tubular member may be configured such that at least one of the ends of the first tubular member or the second tubular member is positionable inside at least one of the ends of the other of the first tubular member or second tubular member. The connection arrangement may also include a latch arrangement including a latch hook pivotably attached to the first tubular member and rotatable about a first axis, and a striker arrangement attached to the second tubular member and including a leg having at least a portion extending along the second longitudinal axis. The striker arrangement may further include a cross member attached to the leg and extending transverse to the second longitudinal axis. The latch hook may be positioned proximate to the cross member when one of the ends of the first tubular member or the second tubular member is positioned inside one of the ends of the other of the first tubular member or the second tubular member such that rotation of the latch hook in a first rotational direction engages the cross member and effects a clamping force between the first tubular member and the second tubular member in a direction transverse to the first axis.

At least some embodiments described herein may include a connection arrangement for tubular members that includes a latch arrangement including a latch hook pivotably attached to a first tubular member about a first axis. The connection arrangement may also include a striker arrangement attached to a second tubular member and including a leg positioned along a length of the second tubular member and a transverse member connected to the leg and extending transverse to the length of the second tubular member. The transverse member may be positioned proximate to the latch hook when an end of the first tubular member is positioned adjacent to an end of the second tubular member such that rotation of the latch hook in a first rotational direction engages the transverse member and effects a clamping force between the first tubular member and the second tubular member in a direction transverse to the first axis.

At least some embodiments described herein may include a connection arrangement for tubular members that includes a latch arrangement including a latch hook attached to a first tubular member and rotatable relative to the first tubular member about a first axis. The connection arrangement may also include a striker arrangement attached to a second tubular member defining a second axis and including a leg having at least a portion extending along the second axis. The striker arrangement may further include a transverse member attached to the leg and extending transverse to the second axis. The latch hook may be positioned proximate to the transverse member when an end of the first tubular member is positioned adjacent to an end of the second tubular member such that rotation of the latch hook in a first rotational direction engages the transverse member and effects a clamping force between the first tubular member and the second tubular member in a direction transverse to the first axis.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
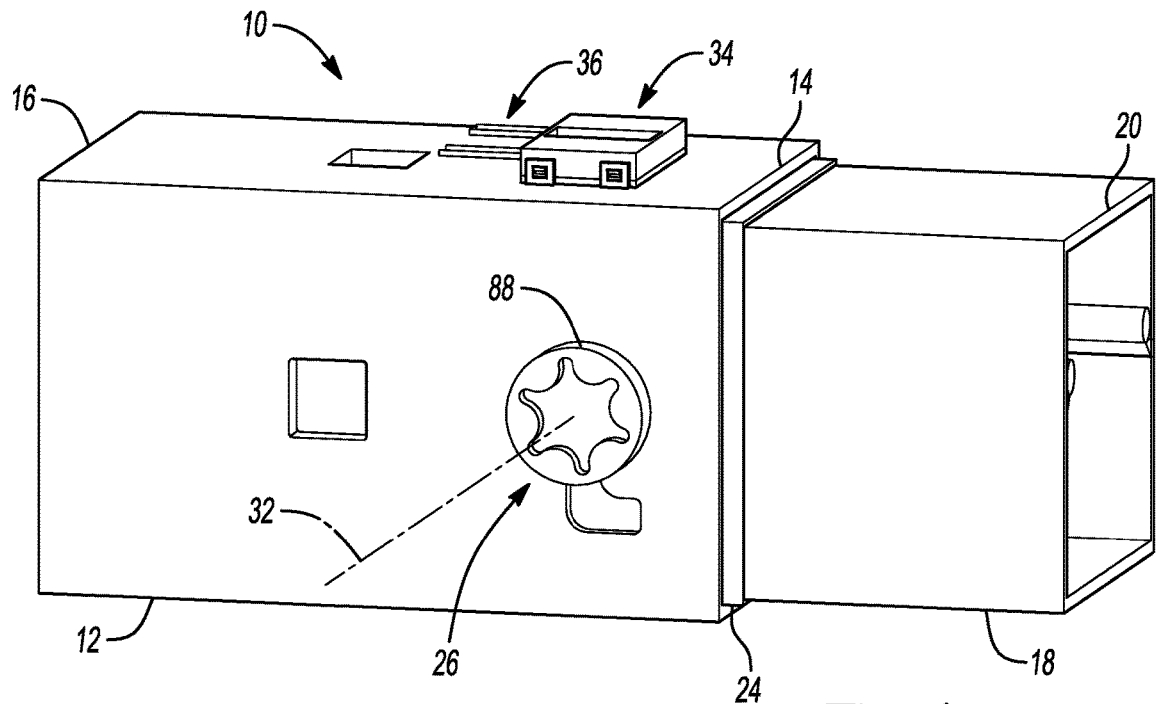
FIG. 1 shows a side perspective view of a connection arrangement for tubular members in accordance with embodiments described herein.

FIG. 1 shows a connection arrangement for tubular members 10 in accordance with embodiments described herein. The connection arrangement 10 includes a first tubular member 12 having first and second ends 14, 16, and a second tubular member 18 having a first end 20 and second end 22—see, e.g., FIG. 3. As shown in FIG. 1, the first and second tubular members 12, 18 each have a square cross section, although in other embodiments, the tubular members may have different cross-sectional shapes, such as rectangular, oval, round, etc. In the embodiment shown in FIG. 1, the cross section of the second tubular member 18 is somewhat smaller than the cross section of the first tubular member 12 such that the second end 22 of the second tubular member 18 is positionable inside the first end 14 of the first tubular member 12. In fact, in this embodiment, there is a sliding fit between the first and second tubular members 12, 18, and to account for manufacturing tolerances and to reduce undesirable noise such as buzz, squeak, or rattle (BSR), a plastic sleeve 24 is positioned between the respective ends 14, 22 of the first and second tubular members 12, 18 when they are fitted together.

The connection arrangement 10 also includes a latch arrangement 26 and a striker arrangement 28, both shown in more detail in FIGS. 2-5. As explained in more detail below, the latch arrangement 26 includes a latch hook 30—see FIG. 2—that is pivotably attached to the first tubular member 12 and is rotatable about a first axis 32. The embodiment shown in FIGS. 1 and 2 include a first electrical contact arrangement 34 disposed on the first tubular member 12. Several wires 36 are shown connected to the electrical contact arrangement 34. The wires 36 may be connected to any of a number of electrical systems within the structure where the connection arrangement 10 is being used. As described in conjunction with FIG. 3, the connection arrangement 10 also includes a second electrical contact arrangement 38 disposed on the second tubular member 18. The first and second electrical contact arrangements 34, 38 are configured so that they form an electrical connection when the tubular members 12, 18 are mechanically connected to each other—see, e.g., FIG. 5. In other embodiments, a differently configured electrical connection may be used, such as flat-wire connections, etc. In some embodiments, the connection arrangement may not include an electrical contact arrangement.

Figure 2:
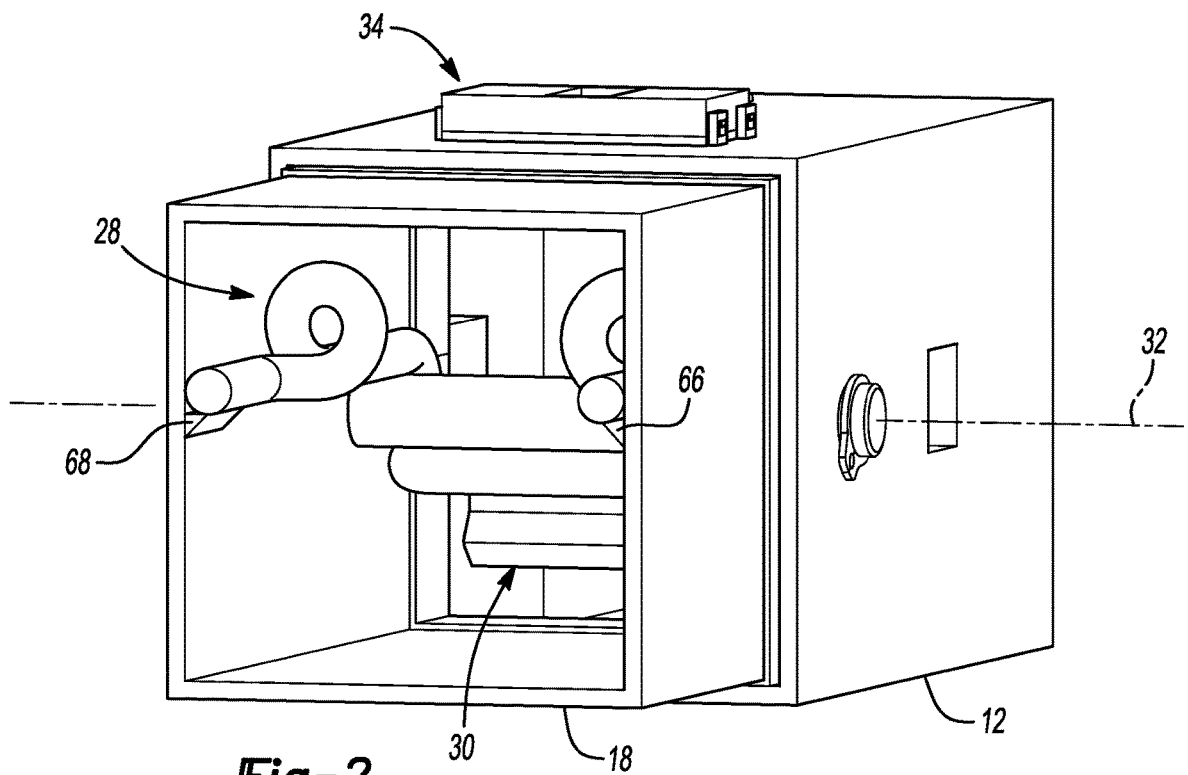
FIG. 2 shows an end perspective view of the connection arrangement for tubular members shown in FIG. 1.
Figure 3:
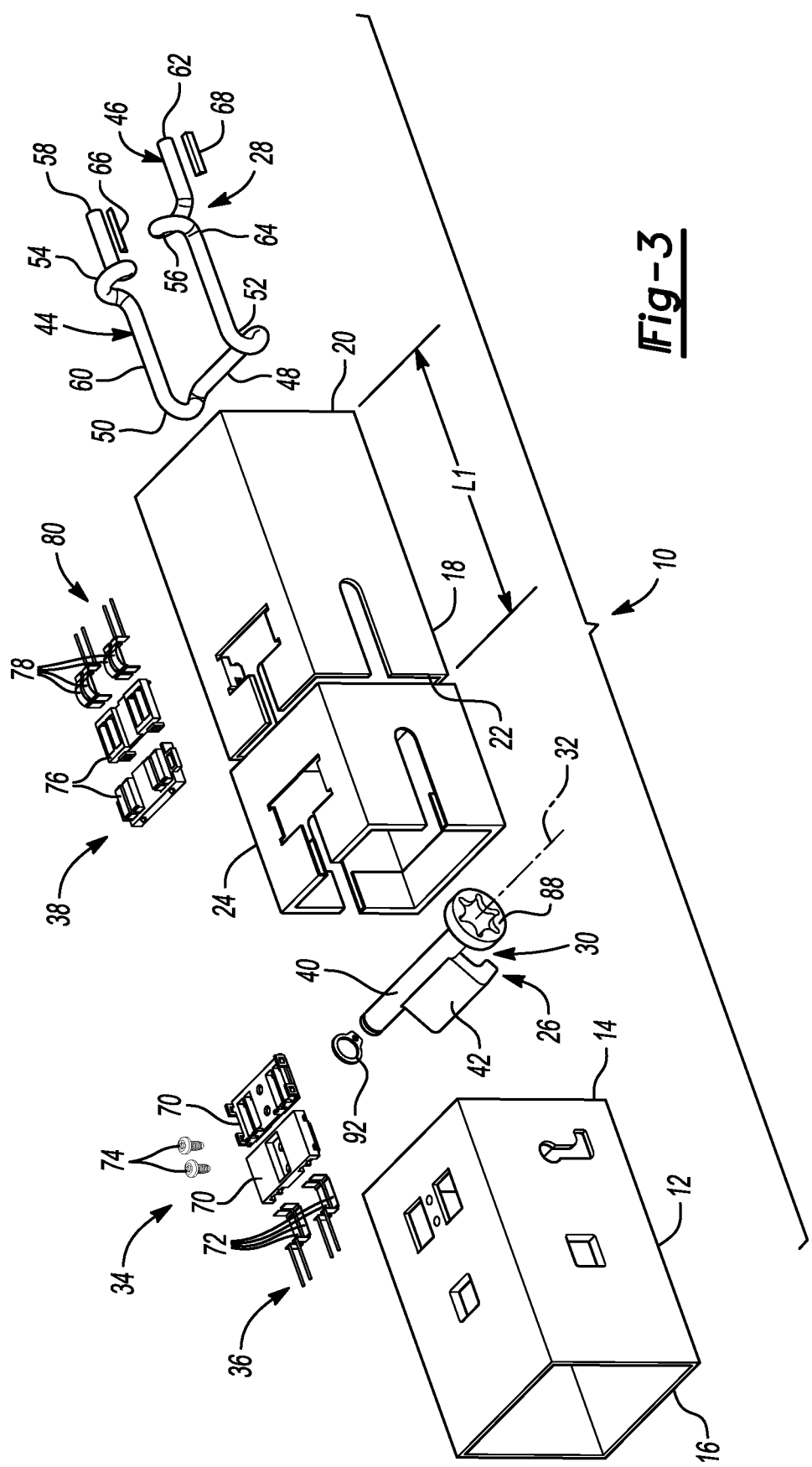
FIG. 3 shows an exploded view of the connection arrangement for tubular members shown in FIG. 1.

FIG. 3 shows an exploded view of the connection arrangement 10. As shown in FIG. 3, the latch arrangement 26 includes the latch hook 30, which has a cylindrical portion 40 and an arm 42 extending therefrom. Also shown in FIG. 3 is the striker arrangement 28, which includes two legs 44, 46 and a cross member 48 attached to the two legs 44, 46. In the embodiment shown in FIG. 3, the leg 44 is attached to the cross member 48 through a curved member or foot 50 at one end of the leg 44, and the leg 46 is attached to the cross member 48 through a second curved member or foot 52 at one end of the leg 46. Each of the legs 44, 46 includes a helical portion 54, 56, which, as described in more detail below, are configured to facilitate deflection of the striker arrangement 28. As shown in FIG. 3, the leg 44 includes a first portion 58 and a second portion 60 configured such that the helical portion 54 is positioned between them. Similarly, the leg 46 includes a first portion 62 and a second portion 64 having the helical portion 56 positioned between them. The second portions 60, 64 of the legs 44, 46 are respectively attached to the feet 50, 52, which connects them to the cross member, which may also be conveniently referred to as a transverse member 48. The first portions 58, 62 of the legs 44, 46 are both configured to be attached to the second tubular member 18. In the embodiment shown in FIG. 3, the first portions 58, 62 are welded to the inside of the second tubular member 18 with weld beads 66, 68, which are also illustrated in FIG. 2.

FIG. 3 also shows the first and second electrical contact arrangements 34, 38 in more detail. The electrical contact arrangement 34 includes a two-part housing 70, a number of electrical contacts 72, and fasteners 74. Similarly, the electrical contact arrangement 38 includes a two-part housing 76, electrical contacts 78, and several wires 80 attached to the electrical contacts 78. In the embodiment shown in FIG. 3, the electrical contacts 72, 78 are biased toward each other so that when the first and second tubular members 12, 18 are mechanically connected, the electrical contact 72, 78 slide across each other and form a robust electrical connection. One application in which a connection arrangement for tubular members, such as the connection arrangement 10, may be conveniently used is in a vehicle seating system. In such applications, the electrical contact arrangements 34, 38 may be used to connect electrical systems within the vehicle seating system to power and control circuitry that may be connected to any of a number of vehicle systems—e.g., video displays, seat motors, airbags, heaters, fans, etc. Therefore, as described in more detail below in conjunction with FIGS. 4 and 5, the connection arrangement 10 may be configured to provide not only a mechanical connection between tubular members, but also an electrical connection that is automatically completed when the tubular members are mechanically connected.

Figure 4:
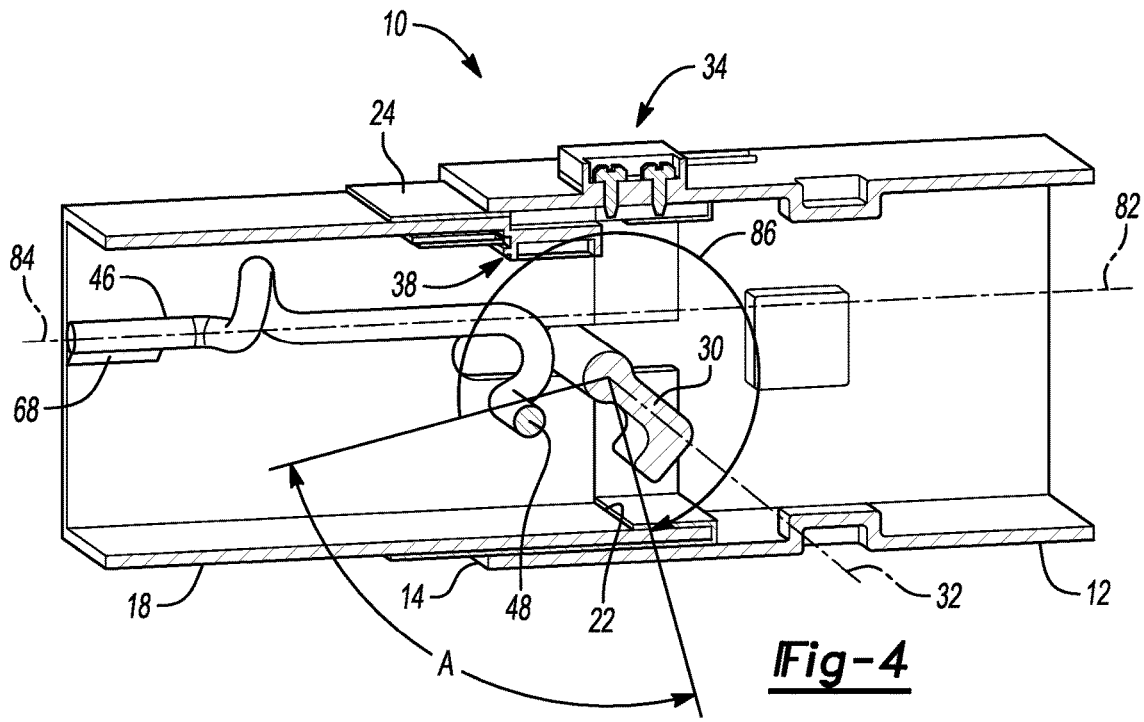
FIG. 4 shows a sectional view of the connection arrangement for tubular members shown in FIG. 1 in a pre-engagement position.

FIG. 4 shows a cross-sectional view of the connection arrangement 10. In FIG. 4, the second tubular member 18 is partially inserted into the first tubular member 12 such that the end 22 of the second tubular member 18 is positioned inside the end 14 of the first tubular member 12. In this position, the end 14 of the first tubular member 12 is positioned adjacent to the end 22 of the second tubular member 18 and the latch arrangement 26 is ready to engage the striker arrangement 28 to mechanically connect the first and second tubular members 12, 18. More particularly, the transverse member 48 is positioned proximate to the latch hook 30. In other embodiments, the ends of the tubular members may abut each other rather than having one fit inside the other, which would also place the end of one of the tubular members adjacent an end of the other tubular member. As shown in FIG. 4, the first tubular member 12 defines a first longitudinal axis 82 while the second tubular member 18 defines a second longitudinal axis 84. With this configuration, the cross member 48 extends transverse to a length (L1)—see, e.g., FIG. 3—of the second tubular member 18, and more particularly, it extends transverse to the second longitudinal axis 84.

The two longitudinal axes 82, 84 are shown as being coincident in FIG. 4, although they may be otherwise defined. As shown in FIG. 4, the leg 46 of the striker arrangement 28 extends along a length of the second tubular member 18, and more particularly, extends along the second longitudinal axis 84, which may be conveniently referred to as a second axis 84 to distinguish it from the first axis 32 about which the latch hook 30 rotates. In the embodiment shown in FIG. 4, the leg 46 is parallel, or generally parallel, to the second axis 84, while the transverse member 48 is perpendicular, or generally perpendicular, to the leg 46 and the second axis 84. As used herein, the terms "generally parallel" and "generally perpendicular" mean that the elements are parallel or perpendicular within manufacturing tolerances. In other embodiments, the legs 44, 46 of the striker arrangement 28 may not be parallel to the second axis 84. Similarly, in other embodiments, the cross member 48 may not be perpendicular to a length of the second tubular member 18 or the second axis 84, although it still may be transverse to—i.e., oriented in a direction that is across—the length of the second tubular member or the second axis 84.

When the first and second tubular members 12, 18 are in the position shown in FIG. 4, the latch hook 30 may be rotated in a first direction—which in FIG. 4 is clockwise as illustrated by the arrow 86—to engage the transverse member 48 to bring the first and second tubular members 12, 18 into mechanical engagement. As shown in FIG. 4, the angle (A) is approximately 90°, which means that from the time the latch hook 30 engages the cross member 48 until the mechanical engagement is complete, the latch hook 30 travels approximately 270°. The cylindrical portion 40 of the latch hook 30 includes a head 88—see, e.g., FIG. 1—which in this embodiment is configured with a Torx pattern; this is particularly convenient for robotic processes. In other embodiments, a slot, Phillips head, or other configuration may be used to facilitate rotation of the latch hook 30. Also shown in FIG. 4, the first and second electrical contact arrangements 34, 38 are disconnected from each other and are not forming an electrical connection.

Figure 5:
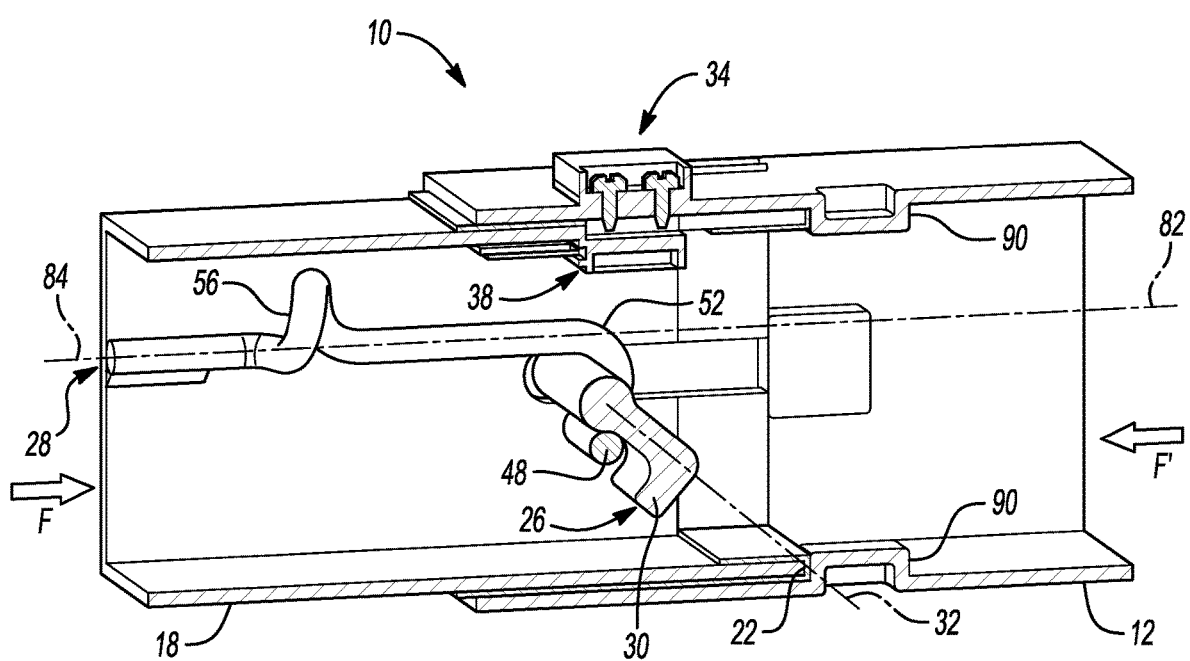
FIG. 5 shows a sectional view of the connection arrangement for tubular members shown in FIG. 1 in a post-engagement position.

FIG. 5 shows the connection arrangement 10 after the latch arrangement 26 has been engaged with the striker arrangement 28, and more particularly, after the latch hook 30 has been rotated in the first rotational direction to engage the cross member 48. This engagement effects a clamping force—see arrows (F—F')between the first tubular member 12 and the second tubular member 18. It also brings together the first and second electrical contact arrangements 34, 38 so that they form an electrical connection. As shown in FIG. 5, the latch hook 30 is engaged with the cross member 48. More particularly, after rotation of the latch hook 30 to the position shown in FIG. 5, the foot 52 has captured the cylindrical portion 40 of the latch hook 30 to secure the connection between the first and second tubular members 12, 18. It is understood that the cylindrical portion 40 of the latch hook 30 will also be captured by the foot 50 associated with the other leg 44 of the striker arrangement 28. In this way, at least some of the clamping force is carried by the cylindrical portion 40 of the latch hook 30, which is now loaded in shear. Also shown in FIG. 5, is the end 22 of the second tubular member positioned against an indentation 90 in the first tubular member 12. In the embodiment shown in FIG. 1-5 there are several of these indentations 90, which in this embodiment are configured as "semi-pierces". These semi-pierces 90 provide a hard stop for the second tubular member 18 when it is inserted into the first tubular member 12. To disengage the first and second tubular members 12, 18 from each other, the latch hook 30 need only be rotated in a second direction opposite to the first direction—which is counterclockwise with the orientation shown in FIG. 5.

As described above, each of the legs 44, 46 of the striker arrangement 28 respectively includes a helical portion 54, 56—see FIG. 3. In the embodiment shown in FIGS. 3-5, each of the helical portions 54, 56 includes a single coil integrally formed with its respective leg 44, 46. In the presence of a clamping force, such as the clamping force (F—F'), the helical portions 54, 56 deflect in the direction of the clamping force and provide a spring effect to further secure the tubular members 12, 18 together. Thus, the helical portions 54, 56 are configured to facilitate deflection of the striker arrangement 28 in the direction of the clamping force. In other embodiments, the helical portions may include more than one coil, or even less than one full coil, depending on the desired response.

The choice of materials and dimensions may also influence the spring effect. In the embodiment illustrated in FIGS. 3-5, the legs 44, 46, the feet 50, 52, and the transverse member 48 are manufactured from a single piece of 5 mm steel wire, although other materials and sizes may be used to obtain a desired effect. In the embodiments shown in FIGS. 3-5, the tubular members 12, 18 are made from 16 mm square tubing that is 2 mm thick, although, similar to the construction of the latch arrangement 26, embodiments described herein may be configured with tubular members having different cross sections, thicknesses, and materials.

As shown in FIG. 5, the direction of the clamping force (F—F') is perpendicular, or generally perpendicular, to the axis of rotation 32 of the latch hook 30. This is particularly useful for the attachment of tubular members, such as the tubular members 12, 18, and could not be successfully achieved with a fastening system having the axis of rotation parallel to the clamping force. Even if it were possible to configure a latch hook with an axis of rotation parallel to the clamping force, there would be no way to access the latch hook to rotate it into engagement because it would be within the interior of the tubular members. And if two such fasteners were used on opposite outside surfaces of the tubular members, the clamping force would not be along the length of the tubular members, it would be perpendicular to it and significantly less effective.

In addition to the foregoing, embodiments described herein—such as illustrated in FIGS. 3-5—provide a strong structural support for the latch hook 30. In particular, the cylindrical portion 40 of the latch hook 30 is inserted entirely through the first tubular member 12 so that it is supported on both sides. The head 88 stops the cylindrical portion 40 from being pushed out of the other side of the tubular member 12, and once it is inserted, a locking ring 92—see FIG. 3—is attached to the other side of the cylindrical portion 40 keep the latch hook 30 secured to the first tubular member 12. This configuration facilitates a strong attachment between the tubular members 12, 18 that would not be achievable if the axis of rotation of the latch hook 30 were parallel to the clamping force.

Figure 6:
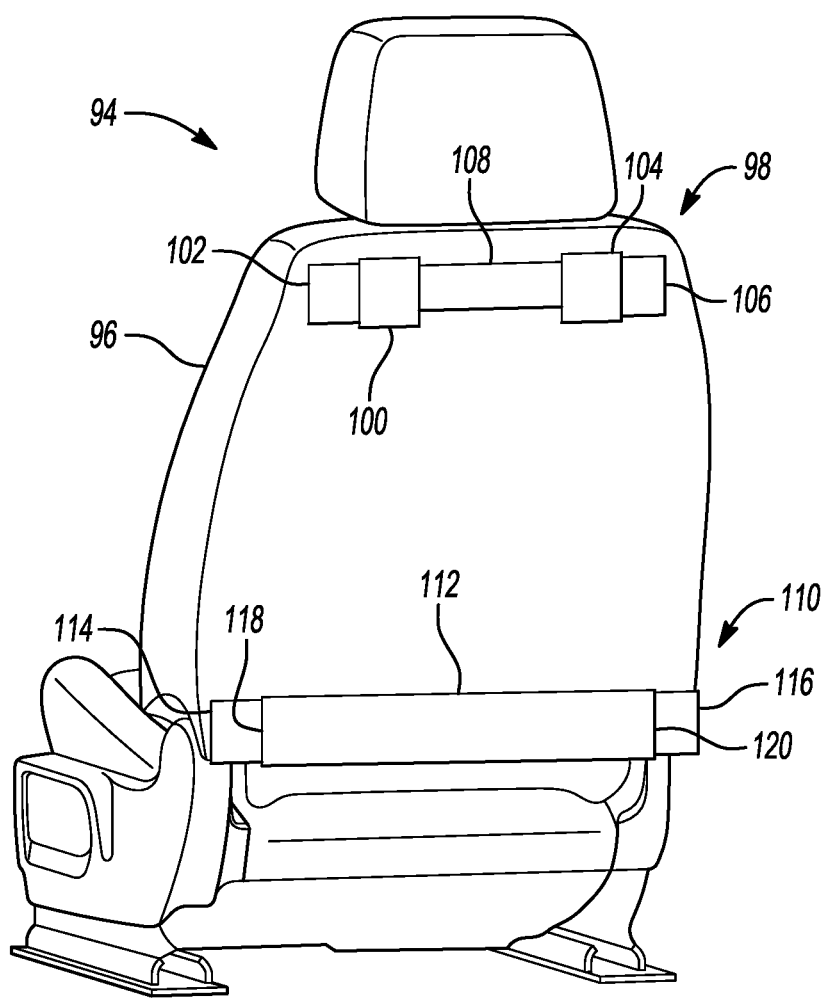
FIG. 6 shows a vehicle seat that includes a connection arrangement for tubular members in accordance with embodiments described herein.

As described above, the tubular connection arrangement 10 may be particularly well-suited for use in connecting structural members. FIG. 6 shows two examples of how a connection arrangement, such as the connection arrangement 10, may be used in a vehicle seating system. FIG. 6 shows a vehicle seat 94 with examples of a connection arrangement as described herein schematically illustrated as part of the support structure of a seat back 96. One configuration of a connection arrangement 98 is shown at the top of the seat back 96. The connection arrangement 98 actually includes two connection arrangements, each of which is configured similarly to the connection arrangement 10 described above. Specifically, a first tubular member 100 is connected to a second tubular member 102 on the left side of the seat back 96. Similarly, another first tubular member 104 is connected to another second tubular member 106 on the right side of the seat back 96. The second tubular members 102, 106 may be, for example, welded onto existing seat structures.

Each of the first tubular members 100, 104 are relatively short and are configured like the first tubular member 12 described above. Similarly, each of the second tubular members 102, 106 are also relatively short and are configured like the second tubular member 18 described above. To provide additional structural support, a connecting element 108 is positioned between and attached to each of the first tubular members 100, 104. The connecting element 108 may be, for example, a stamped frame structure such as commonly used in vehicle seating systems. This configuration has the advantage of keeping all of the first and second tubular members the same size and shape, while allowing the connecting element 108 to vary in length to accommodate seat backs having different widths.

Another configuration is shown near the bottom of the seat back 96. In this configuration, a connection arrangement 110 includes a single first tubular member 112 connected between two different second tubular members 114, 116. In this configuration, each of the second tubular members 114, 116 may be configured similarly to or the same as the second tubular members 102, 106—and even the second tubular member 18 described above—while the first tubular member 112 is configured somewhat differently from the second tubular member 12 described above. Specifically, the first tubular member at 112 is configured with two latch arrangements, such as the latch arrangement 26. The two latch arrangements are configured near the ends 118, 120 of the first tubular member 112 and respectively engage with striker arrangements positioned within the second tubular members 114, 118. Test—n The configuration shown at the bottom of the seat back 96 has the advantage of not requiring a connecting element, such as the connecting element 108, but it does require that the first tubular member 112 be sized for a particular seating system. Because of its length, the first tubular member 112 will have some flexibility to allow it to be first inserted over one of the second tubular members 114, 116, and then deflected slightly to allow it to be inserted over the other of the second tubular members 114, 116. Although the connection arrangements 98, 110 are shown in FIG. 6 connected to a seat back 96 and oriented generally horizontally, other embodiments may have connection arrangements oriented vertically or at an oblique angle across a vehicle seat-back. A first tubular member, such as the first tubular member 112, may be U-shaped or have other geometries. In some embodiments, connection arrangements such as described herein may be used with and connected to a seat bottom and may be oriented in a fore-aft direction or a transverse direction. In still other embodiments, connection arrangements such as described herein may be used in other parts of a seating system, in other systems within a vehicle separate from the seating systems, or even in non-vehicle applications.

Figure 7:
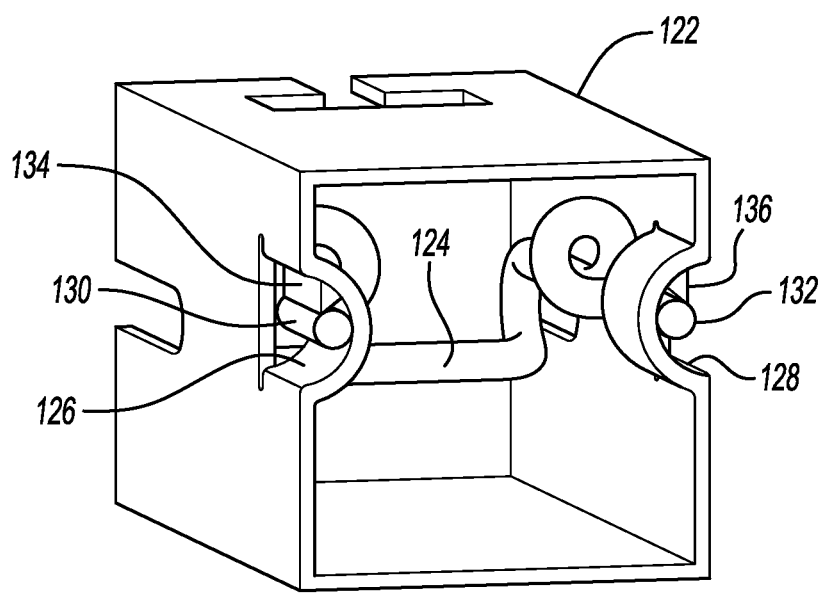
FIG. 7 shows an alternative connection feature for a portion of a connection arrangement for tubular members in accordance with embodiments described herein.

As described above, the striker arrangement 28 is welded to an inside of the second tubular member 18. This provides a strong attachment which enables a significant clamping force to be imposed between the two tubular members 12, 18. FIG. 7 shows an embodiment of a second tubular member 122 that is configured to accommodate attachment of a striker arrangement 124 on the outside of the second tubular member. As shown in FIG. 7, the tubular member 122 is configured with concave-inward portions 126, 128 positioned on opposite sides of the tubular member 122. With this configuration, legs 130, 132 of the striker arrangement 124 can be positioned on an outside of the tubular member 122 and welded on the outside surface as shown by weld beads 134, 136. Although this configuration requires a somewhat more complicated geometry for the second tubular member, an automated welding process may be more easily achieved because the point of connection is on the outside surface of the tube, rather than the inside surface.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A connection arrangement for tubular members, comprising:
    a first tubular member having two ends and defining a first longitudinal axis;
    a second tubular member having two ends and defining a second longitudinal axis, the first tubular member and the second tubular member being configured such that at least one of the ends of the first tubular member or the second tubular member is positionable inside at least one of the ends of the other of the first tubular member or second tubular member;
    a latch arrangement including a latch hook pivotably attached to the first tubular member and rotatable about a first axis; and
    a striker arrangement attached to the second tubular member and including a leg having at least a portion extending along the second longitudinal axis, the striker arrangement further including a cross member attached to the leg and extending transverse to the second longitudinal axis, and
    wherein the latch hook is positioned proximate to the cross member when one of the ends of the first tubular member or the second tubular member is positioned inside one of the ends of the other of the first tubular member or the second tubular member such that rotation of the latch hook in a first rotational direction engages the cross member and effects a clamping force between the first tubular member and the second tubular member in a direction transverse to the first axis.

2. The connection arrangement of claim 1, wherein the latch hook includes a cylindrical portion and an arm extending therefrom, and the striker arrangement further includes a foot positioned an end of the leg such that the foot captures the cylindrical portion of the latch hook after the latch hook is rotated in the first rotational direction to engage the cross member.

3. The connection arrangement of claim 2, wherein the leg of the striker arrangement includes a helical portion configured to facilitate deflection of the striker arrangement in the direction of the clamping force.

4. The connection arrangement of claim 3, wherein the leg includes a first portion and a second portion each extending along the second longitudinal axis, the first portion being attached to the second tubular member and the second portion having the foot attached thereto, and wherein the helical portion is positioned between the first portion and the second portion and includes at least one coil integrally formed with the leg.

5. The connection arrangement of claim 1, further comprising a first electrical contact arrangement disposed on the first tubular member and a second electrical contact arrangement disposed on the second tubular member such that the first electrical contact arrangement and the second electrical contact arrangement form an electrical connection when the latch hook is rotated in the first rotational direction to engage the cross member.

6. The connection arrangement of claim 1, wherein the striker arrangement includes two of the legs, and the cross member is positioned between the two legs.

7. The connection arrangement of claim 6, wherein each of the legs is attached to an inside of the second tubular member.

8. A connection arrangement for tubular members, comprising:
    a latch arrangement including a latch hook pivotably attached to a first tubular member about a first axis; and
    a striker arrangement attached to a second tubular member and including a leg positioned along a length of the second tubular member and a transverse member connected to the leg and extending transverse to the length of the second tubular member, the transverse member being positioned proximate to the latch hook when an end of the first tubular member is positioned adjacent to an end of the second tubular member such that rotation of the latch hook in a first rotational direction engages the transverse member and effects a clamping force between the first tubular member and the second tubular member in a direction transverse to the first axis.

9. The connection arrangement of claim 8, wherein the leg of the striker arrangement includes a helical portion having at least one coil integrally formed with the leg.

10. The connection arrangement of claim 9, wherein the leg includes a first portion attached to the second tubular member and extending along the length of the second tubular member, a second portion extending along the length of the second tubular member, and the helical portion is positioned between the first portion of the leg and the second portion of the leg.

11. The connection arrangement of claim 8, wherein the latch hook includes a cylindrical portion and an arm extending therefrom, and the striker arrangement further includes a foot positioned an end of the leg such that the foot captures the cylindrical portion of the latch hook after the latch hook is rotated in the first rotational direction to engage the transverse member.

12. The connection arrangement of claim 11, wherein the striker arrangement includes two of the legs, and the transverse member is positioned between and connected to the foot on one of the legs and the foot on the other of the legs.

13. The connection arrangement of claim 8, further comprising a vehicle seat, wherein the connection arrangement is attached to a portion of the vehicle seat.

14. The connection arrangement of claim 8, further comprising a first electrical contact arrangement disposed on the first tubular member and a second electrical contact arrangement disposed on the second tubular member such that the first electrical contact arrangement and the second electrical contact arrangement form an electrical connection when the latch hook is rotated in the first rotational direction to engage the transverse member.

15. A connection arrangement for tubular members, comprising:
a latch arrangement including a latch hook attached to a first tubular member and rotatable relative to the first tubular member about a first axis; and
a striker arrangement attached to a second tubular member defining a second axis and including a leg having at least a portion extending along the second axis, the striker arrangement further including a transverse member attached to the leg and extending transverse to the second axis, and
wherein the latch hook is positioned proximate to the transverse member when an end of the first tubular member is positioned adjacent to an end of the second tubular member such that rotation of the latch hook in a first rotational direction engages the transverse member and effects a clamping force between the first tubular member and the second tubular member in a direction transverse to the first axis.

16. The connection arrangement of claim 15, wherein the latch hook includes a cylindrical portion and an arm extending therefrom, and the striker arrangement further includes a foot positioned an end of the leg such that the foot captures the cylindrical portion of the latch hook after the latch hook is rotated in the first rotational direction to engage the transverse member.

17. The connection arrangement of claim 16, wherein the striker arrangement includes two of the legs, and the transverse member is positioned between the two legs.

18. The connection arrangement of claim 15, wherein the leg of the striker arrangement includes a helical portion configured to facilitate deflection of the striker arrangement in the direction of the clamping force.

19. The connection arrangement of claim 18, wherein the leg includes a first portion and a second portion each extending along the second axis, and wherein the helical portion is positioned between the first portion and the second portion and includes at least one coil integrally formed with the leg.

20. The connection arrangement of claim 15, further comprising a first electrical contact arrangement disposed on the first tubular member and a second electrical contact arrangement disposed on the second tubular member such that the first electrical contact arrangement and the second electrical contact arrangement form an electrical connection when the latch hook is rotated in the first rotational direction to engage the transverse member.

* * * * *